UNITED STATES PATENT OFFICE.

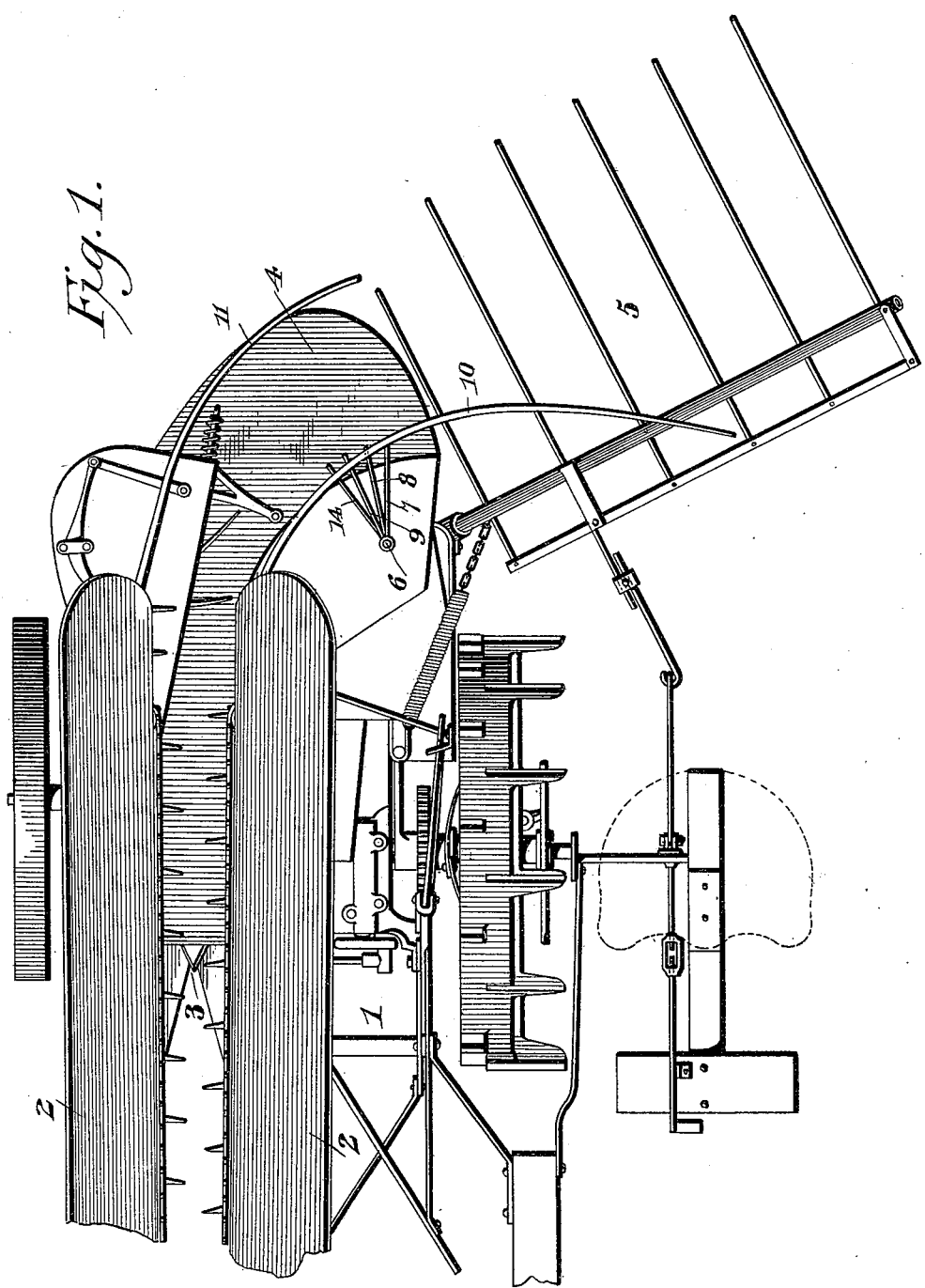

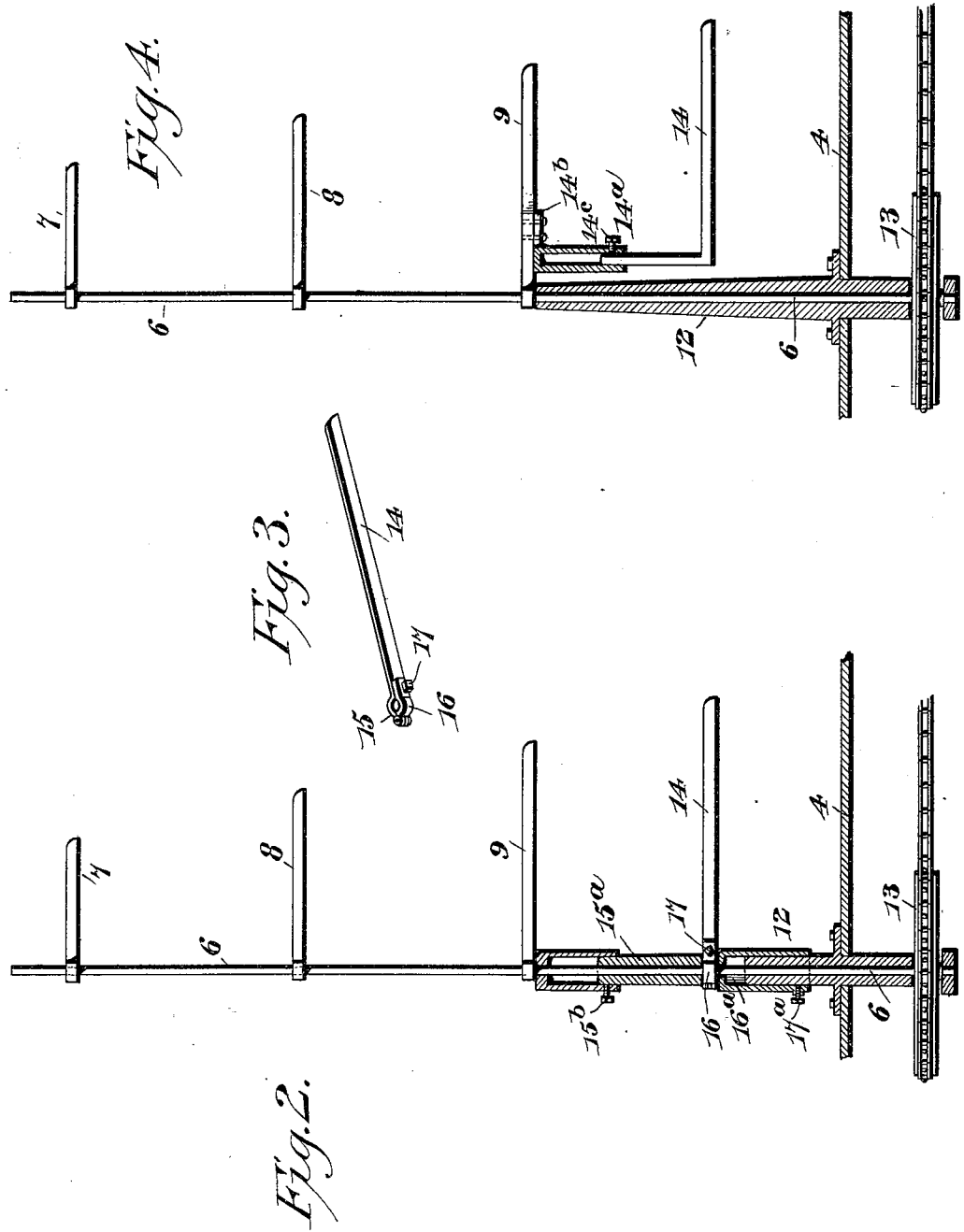

JOHN P. DEGNAN, OF CHENOA, ILLINOIS.

CORN-HARVESTER ATTACHMENT.

SPECIFICATION forming part of Letters Patent No. 646,102, dated March 27, 1900.

Application filed June 18, 1898. Serial No. 683,851. (No model.)

*To all whom it may concern:*

Be it known that I, JOHN P. DEGNAN, a citizen of the United States, residing at Chenoa, in the county of McLean and State of Illinois, have invented a new and useful Corn-Harvester Attachment, of which the following is a specification.

This invention relates to corn-harvesting machines; and it has for its object to provide a new and useful attachment for the discharge-shaft of an ordinary self-binding corn-harvesting machine, whereby such discharge-shaft, in connection with the rotating arms carried thereby, will more effectively perform the function of sweeping the bound bundle off of the binder-deck to the ground or into the bundle-carrier with which some corn-harvesting machines are equipped.

The fundamental feature of the present invention is the use of a supplemental or auxiliary discharge-arm for the discharge-shaft of a corn-harvester, said supplemental or auxiliary discharge-arm being designed to occupy a position relative to the binder-deck so as to entirely relieve the deck of accumulations of short tangled stalks, which often interfere with the free discharge of a bundle from the binding mechanism. In thus relieving the binder-deck from accumulations of tangled stalks the attachment contemplated by the present invention insures a proper discharge or delivery of the bundle from the binder-deck into the bundle-carrier, so that the latter attachment of the machine will dump the bundles in proper shape without promiscuously scattering the same along the ground, and thereby increasing the labor of carrying the bundles to the shock.

A further object of the invention is to provide a supplemental arm attachment which shall be so arranged as to evenly distribute the strain on the discharge-shaft, and thereby lighten the draft of the machine, while also providing for throwing the stalks from the binder-deck a sufficient distance to prevent the draft-animals from trampling thereon.

Further objects of the invention will appear as the invention is more fully disclosed; and the same consists in the novel construction, combination, and arrangement of parts hereinafter more fully described, illustrated, and claimed, and the preferred embodiment of the invention is shown in the accompanying drawings, in which—

Figure 1 is a plan view of a corn-harvesting machine, showing the proper applied position of the attachment. Fig. 2 is a detail vertical sectional view showing only the discharge-shaft of the harvester and one way of using the supplemental or auxiliary discharge-arm in connection therewith. Fig. 3 is a detail in perspective of the supplemental or auxiliary discharge-arm, illustrating one form of clamp for detachably and adjustably fitting the arm to the discharge-shaft. Fig. 4 is a view similar to Fig. 2, illustrating a modified form of the supplemental or auxiliary discharge-arm and a different manner of connecting the same with the discharge-shaft.

Referring to the accompanying drawings, the numeral 1 designates the framework of an ordinary corn-harvesting machine, carrying the usual gatherers 2, which coöperate with the cutting mechanism 3 to provide for cutting and gathering the stalks as the machine travels along the row and the delivery of the stalks in an upright position onto the horizontal binder-deck 4, above which and at one side of the plane of the stalks is located the ordinary binding mechanism of the machine, this binding mechanism not being fully illustrated in Fig. 1 of the drawings, as the same is of the usual construction, and the omission thereof exposes the proper applied position of the supplemental or auxiliary discharge-arm, forming the essential feature of the present invention.

When a sufficient number of stalks have accumulated on the binder-deck 4 to form a bundle, the binding mechanism of the machine comes into play and encircles the bundle with a band in the ordinary manner, and at this point in the operation of the machine the bundle is discharged from the binder-deck either onto the ground or into the bundle-carrier 5 when the machine is equipped with an attachment of this character. The bundle-carrier 5 forms no part of the present invention, and a common type of carrier is illustrated in Fig. 1 of the drawings. The discharge of the bundles from the binder-deck is effected through the medium of a vertical rotating discharge-shaft 6, arranged in close proximity to the binding mechanism and carrying a plurality of laterally-extending discharge-arms 7, 8, and 9, which discharge-arms project through the spaces of the curved stripper 10, which is arranged opposite the usual guiding-rods 11, and as the shaft 6 rotates are carried directly against the bound bundle and sweep the same from the binder-deck onto the ground or into the bundle-carrier in the manner well understood by those skilled in the art.

The vertical rotating discharge-shaft 6 is journaled at its lower end in the tubular bearing-standard 12, fastened to the binder deck or platform at one side of the stripper 10, and beneath the said deck or platform 4 the lower extremity of the shaft 6 has fitted thereto the sprocket-wheel 13, which is connected with the operating-gearing in the usual manner to provide for imparting to the discharge-shaft the necessary movement to cause the arms thereof to sweep against the bound bundle and discharge the same from the deck or platform. The laterally-extending discharge-arms 7, 8, and 9 are the usual discharge-arms, which are fitted to the discharge-shaft of a corn-harvesting machine and are spaced at suitable distances apart to provide for carrying out the ordinary discharging operation of the machine; but in most types of corn-harvesting machines the lowermost discharge-arm 9, fitted to the discharge-shaft, is disposed at too great an elevation above the binder deck or platform to insure a proper discharge of the bundle from the deck or platform or to prevent the latter from becoming clogged by accumulations of tangled stalks and the like. So in order to obviate these objections the present invention contemplates the use of an extra or supplemental discharge-arm 14, which is designed to be arranged in a plane below the usual discharge-arm and in relatively-close proximity to the binder deck or platform 4.

Since the supplemental discharge-arm 14 is designed to be arranged relatively close to the binder deck or platform, it is necessary that this arm be made adjustable to suit different conditions of crops, and while various means may be resorted to for detachably and adjustably fitting the said arm to the discharge-shaft one means for securing this result is illustrated in Figs. 2 and 3 of the drawings. In these figures of the drawings the discharge-arm 14 is shown to consist of a straight bar of a sufficient length to project through and work beyond the stripper 10 in the usual manner, and provided at one end with a hinged clamp-eye 15, whose movable member 16 is held in place by means of a set-screw 17, thereby completing a fastening permitting the said arm 14 not only to be detachably clamped to the shaft 6, but also to be adjusted thereon to vary the distance between the same and the binder deck or platform 4.

To provide for a proper separation of the supplemental discharge-arm 14 and the lowermost discharge-arm 9 of the series of such arms carried by the discharge-shaft, a telescopic spacing-sleeve $15^a$ is fitted on the shaft between the attached ends of the arms 9 and 14 and the separate telescoping members of the sleeve $15^a$ are held fast in their adjusted positions by means of the set-screw $15^b$. By reason of employing a telescopic sleeve $15^a$ between the arms 9 and 14 the vertical adjustment of the arm 14 is not interfered with, while at the same time the shaft between said arms is completely housed and protected from loose stalks and the like winding therearound.

In providing for the vertical adjustment of the supplemental discharge-arm 14 in the form of attachment shown in Fig. 2 of the drawings it will be necessary to prevent loose stalks and the like, which are swept around by the arm 14, from winding about or wrapping upon the discharge-shaft, and this is prevented by the use of a telescopic cap-sleeve $16^a$. The telescopic cap-sleeve $16^a$ slidably embraces the standard 12 below the arm 14 and is held in its adjusted position on said standard by means of a set-screw $17^a$ passing therethrough and impinging on the standard. It will therefore be seen that the sleeve $16^a$ may be adjusted vertically in conjunction with the arm 14 and serves to completely house in the portion of the discharge-shaft 6 below the plane of movement or "sweep" of said supplemental discharge-arm.

The hinged clamp-eye and the telescopic sleeve features involved in the construction shown in Fig. 2 may be dispensed with by the simple form of attachment illustrated in Fig. 4 of the drawings. In the modification shown in Fig. 4 the tubular bearing-standard 12 for the discharge-shaft is extended upward a sufficient distance from the binder deck or platform 4 to meet the lowermost discharge-arm 9 of the usual series of such arms carried by the discharge-shaft. The said lowermost discharge-arm 9 in the construction referred to forms the medium of connection between the supplemental discharge-arm 14 and the discharge-shaft 6, and to provide for supporting the supplemental discharge-arm from the lowermost discharge-arm 9 of the usual series the said supplemental arm is constructed of a bar bent into a substantial L shape, with a vertical portion $14^a$, having at its upper extremity a right-angled supporting-foot $14^b$, bolted or otherwise suitably secured to the lower side of the said lowermost discharge-arm 9. The L-shaped form of the discharge-arm 14 (shown in Fig. 4) is therefore suspended at the lower side of the lowermost discharge-arm 9, so that the lower horizontal or main portion of the supplemental arm will be disposed in sufficiently-close proximity to the binder deck or platform 4 to insure the proper discharge of the bound bundles and the cleaning of the deck or platform of accumulations of short tangled stalks. In the modified construction shown in Fig. 4 the lower horizontal or main portion of the supplemental arm 14 lies directly opposite the tubular bearing-standard 12, so that in the operation of the said arm 14 loose stalks and the like will not wind about or wrap on the discharge shaft.

While the L-shaped form of the discharge-arm 14 (shown in Fig. 4 of the drawings) may maintain a fixed relation to the discharge-arm 9, supporting the same, it is preferable that said L-shaped arm be capable of vertical adjustment in the same relation as the straight form of the arm shown in Fig. 2 of the drawings, and to secure this result the vertical portion 14$^a$ of the L-shaped arm may be conveniently formed in two sections, one telescoping within the other and adjustably coupled together by means of the set-screw 14$^c$. By loosening the set-screw 14$^c$ the lower horizontal or main portion of the L-shaped arm 14 may be adjusted to variable positions with relation to the binder deck or platform 4.

Other modifications involving different ways of mounting and arranging the supplemental discharge-arm will readily suggest themselves to those skilled in the art, and it will be understood that changes in the form, proportion, and the minor details of construction may be resorted to without departing from the principle or sacrificing any of the advantages of this invention.

Having thus described the invention, what is claimed as new, and desired to be secured by Letters Patent, is—

1. In a self-binding corn-harvesting machine, the combination with the horizontal deck or platform, and the vertical discharge-shaft rising above the deck or platform and carrying the discharge-arms, of a supplemental arm or sweep having adjustable connection with the discharge-shaft and carried thereby in a plane parallel with and relatively close to the deck or platform, said supplemental arm being adjustable to vary the distance between the same and the deck or platform, and an adjustable telescopic sleeve-housing for the shaft adjustable with the supplemental arm, substantially as set forth.

2. In a self-binding corn-harvesting machine, the combination with the horizontal deck or platform and the vertical discharge-shaft rising above the deck or platform and carrying the discharge-arms, of a supplemental discharge-arm connected with said shaft and arranged in relatively-close proximity to the deck or platform, said supplemental arm being adapted for vertical adjustment with respect to the platform and a sleeve-housing for the shaft extending above and below the plane of movement or sweep of the supplemental discharge-arm and independently of which housing the shaft is rotatable whereby said housing will prevent loose stalks and the like from wrapping upon the shaft, substantially as set forth.

3. In a self-binding harvesting-machine, the combination with the discharge-shaft and the arms carried thereby, of the vertical tubular bearing-standard for said shaft arising from the binder deck or platform, a separate supplemental discharge-arm having a detachable and adjustable connection at one end with said shaft, a telescopic spacing-sleeve fitted on the shaft between the supplemental discharge-arm and the arm immediately thereabove, and a telescopic cap-sleeve fitted on the bearing-standard below the supplemental arm, substantially as set forth.

In testimony that I claim the foregoing as my own I have hereto affixed my signature in the presence of two witnesses.

JOHN P. DEGNAN.

Witnesses:
  H. E. MATTOCKS,
  LOUIS WARNER.